US 12,504,224 B2

(12) United States Patent
Wang et al.

(10) Patent No.: US 12,504,224 B2
(45) Date of Patent: Dec. 23, 2025

(54) CONSTANT TEMPERATURE CONTROL METHOD, ELECTRIC DEVICE, AND CONSTANT TEMPERATURE WINE CABINET

(71) Applicants: QINGDAO HAIER SPECIAL FREEZER CO., LTD, Qingdao (CN); HAIER SMART HOME CO., LTD., Qingdao (CN)

(72) Inventors: Desen Wang, Qingdao (CN); Jiangtao Li, Qingdao (CN); Renjie Liu, Qingdao (CN); Qingyan Ge, Qingdao (CN); Tingxiu Zhang, Qingdao (CN); Hailiu Long, Qingdao (CN); Guofeng Li, Qingdao (CN); Jiangong Xing, Qingdao (CN)

(73) Assignees: QINGDAO HAIER SPECIAL FREEZER CO., LTD, Qingdao (CN); HAIER SMART HOME CO., LTD., Qingdao (CN)

( * ) Notice: Subject to any disclaimer, the term of this patent is extended or adjusted under 35 U.S.C. 154(b) by 118 days.

(21) Appl. No.: 18/574,663

(22) PCT Filed: Mar. 1, 2022

(86) PCT No.: PCT/CN2022/078538
§ 371 (c)(1),
(2) Date: Dec. 27, 2023

(87) PCT Pub. No.: WO2023/273371
PCT Pub. Date: Jan. 5, 2023

(65) Prior Publication Data
US 2024/0318902 A1    Sep. 26, 2024

(30) Foreign Application Priority Data
Jun. 28, 2021 (CN) .......................... 202110718618.1

(51) Int. Cl.
*F25D 29/00* (2006.01)
*F25D 31/00* (2006.01)

(52) U.S. Cl.
CPC ......... *F25D 29/005* (2013.01); *F25D 31/002* (2013.01); *F25D 2600/06* (2013.01); *F25D 2700/12* (2013.01)

(58) Field of Classification Search
CPC ......... F25B 2600/0251; F25D 2700/12; F25D 2700/14
See application file for complete search history.

(56) References Cited

U.S. PATENT DOCUMENTS

| 6,725,680 | B1 * | 4/2004 | Schenk ................. F25D 29/00 62/186 |
| 2008/0034768 | A1 * | 2/2008 | Pimentel ............... F25D 17/065 62/180 |

(Continued)

FOREIGN PATENT DOCUMENTS

| CN | 103245164 A | 8/2013 |
| CN | 103697657 A | 4/2014 |

(Continued)

*Primary Examiner* — Lionel Nouketcha
(74) *Attorney, Agent, or Firm* — MUNCY, GEISSLER, OLDS & LOWE, P.C.

(57) ABSTRACT

A constant temperature control method, an electronic device, and a constant temperature wine cabinet. The method includes obtaining a first temperature difference between the first actual temperature of the compartment and the baseline compartment temperature at a baseline environmental temperature; modifying the switch-on and switch-off temperatures of the compressor to obtain a first revised switch-on temperature and a first revised switch-off temperature based on the first temperature difference; obtaining a second temperature difference between the baseline compartment temperature and the second actual temperature of the compartment at an actual environmental temperature; modifying (Continued)

the first revised switch-on temperature and the first revised switch-off temperature to obtain a second revised switch-on temperature and a second revised switch-off temperature based on the second temperature difference; and controlling the compressor to switch on at the second revised switch-on temperature and switch off at the second revised switch-off temperature.

10 Claims, 9 Drawing Sheets

(56) References Cited

U.S. PATENT DOCUMENTS

| | | | |
|---|---|---|---|
| 2020/0088462 A1* | 3/2020 | Ahn | F25D 17/067 |
| 2022/0260300 A1* | 8/2022 | Candeo | F25D 11/02 |

FOREIGN PATENT DOCUMENTS

| | | |
|---|---|---|
| CN | 103486822 B | 8/2015 |
| CN | 105605875 A | 5/2016 |
| CN | 108759289 A | 11/2018 |
| CN | 109373702 A | 2/2019 |
| CN | 110296560 A | 10/2019 |
| CN | 113503683 A | 10/2021 |
| CN | 113503687 A | 10/2021 |
| DE | 3028673 A1 | 3/1992 |

* cited by examiner

1000 obtaining a first temperature difference between the first actual temperature of the compartment and the baseline compartment temperature at a baseline environmental temperature modifying the switch-on and switch-off temperatures of the compressor of the refrigeration appliance to obtain a first revised switch-on temperature and a first revised switch-off temperature based on the first temperature difference obtaining a second temperature difference between the baseline compartment temperature and the second actual temperature of the compartment at an actual environmental temperature modifying the first revised switch-on temperature and the first revised switch-off temperature to obtain a second revised switch-on temperature and a second revised switch-off temperature based on the second temperature difference controlling the compressor of the refrigeration appliance to switch on at the second revised switch-on temperature and switch off at the second revised switch-off temperature

Fig.1

CONSTANT TEMPERATURE CONTROL METHOD, ELECTRIC DEVICE, AND CONSTANT TEMPERATURE WINE CABINET

TECHNICAL FIELD

The present invention relates to the field of refrigeration appliance technology, and particularly to a constant temperature control method, an electronic device, and a constant temperature wine cabinet.

BACKGROUND

As a refrigeration appliance for storing and displaying wine or other beverages, wine cabinets are widely used in daily life, such as in homes, airports, hotels, etc. With the improvement of living standards, the performance requirements for wine cabinets are increasing. For long-term storage of wine, it is necessary to maintain a certain temperature within the wine cabinet.

Currently, wine cabinets on the market are equipped with a single refrigeration function. The wine cabinet is equipped with multiple evaporators and fans corresponding to multiple compartments within the cabinet. The compressor starts refrigeration when the detected temperature is higher than the set upper limit temperature, and stops when the temperature falls below the set lower limit temperature. The single refrigeration mode has some issues: at lower ambient temperatures, the temperature in the cabinet may be too low (e.g., below 5° C.), failing to meet the minimum storage requirements for wine: on the other hand, the single refrigeration mode may cause significant fluctuations in the storage temperature of the wine, which is not conducive to high-quality wine storage.

Moreover, the existing constant temperature control methods for wine cabinets typically involve dividing the environmental temperature into several ranges and controlling the compressor's switch-on and switch-off temperatures for each environmental temperature range to achieve constant temperature. This method requires testing multiple temperature settings in each environmental temperature range to adjust the switch-on and switch-off temperatures of the compressor in each range: then, the adjusted switch-on and switch-off temperatures are further verified to confirm the final switch-on and switch-off temperatures. Therefore, existing constant temperature control methods consume a lot of time and laboratory resources, affecting product development progress and market launch time.

SUMMARY

The problem solved by the present invention is how to achieve a refrigeration system that maintains constant temperature control and ensures that the actual temperature of the compartment is the same as the setting temperature.

To achieve the above object, the present invention provides a constant temperature control method, applicable to a refrigeration appliance, the refrigeration appliance comprising a compartment, wherein the constant temperature control method comprising:

obtaining a first temperature difference between the first actual temperature of the compartment and the baseline compartment temperature at a baseline environmental temperature:

modifying the switch-on and switch-off temperatures of the compressor of the refrigeration appliance to obtain a first revised switch-on temperature and a first revised switch-off temperature based on the first temperature difference:

obtaining a second temperature difference between the baseline compartment temperature and the second actual temperature of the compartment at an actual environmental temperature:

modifying the first revised switch-on temperature and the first revised switch-off temperature to obtain a second revised switch-on temperature and a second revised switch-off temperature based on the second temperature difference; and controlling the compressor of the refrigeration appliance to switch on at the second revised switch-on temperature and switch off at the second revised switch-off temperature.

As an optional technical solution wherein the step of obtaining the first temperature difference between the actual temperature of the compartment and the baseline compartment temperature comprises:

setting the baseline compartment temperature at the baseline environmental temperature:

controlling the compressor according to the first revised switch-on and switch-off temperatures, and measuring the first actual temperature of the compartment:

calculating the first temperature difference between the first actual temperature and the baseline compartment temperature.

As an optional technical solution, wherein the step of obtaining the second temperature difference between the baseline compartment temperature and the actual temperature of the compartment at the actual environmental temperature comprises:

setting the baseline compartment temperature at several different preset environmental temperatures:

controlling the compressor according to the first revised switch-on and switch-off temperatures, measuring the actual temperature of the compartment at several different preset environmental temperatures, and obtaining several third actual temperatures:

calculating the difference between each third actual temperature and the baseline compartment temperature, obtaining several third temperature differences:

establishing a linear regression equation based on several third temperature differences and several different preset environmental temperatures:

obtaining the second temperature difference corresponding to the actual environmental temperature based on the linear regression equation.

As an optional technical solution wherein the refrigeration appliance is a constant temperature wine cabinet.

As an optional technical solution wherein when controlling the compressor of the refrigeration appliance to switch on at the second revised switch-on temperature and switch off at the second revised switch-off temperature, the second actual temperature equals a set compartment temperature.

As an optional technical solution, wherein the set compartment temperature is greater than or less than the baseline compartment temperature.

As an optional technical solution, wherein the baseline environmental temperature is 32° C.: the baseline compartment temperature is 12° C.

The present invention further provides an electronic device, comprising a memory and a processor, the memory storing a computer program that can run on the processor, wherein the processor implements the constant temperature control method as described in any one of technical solutions above when executing the computer program.

The present invention further provides a constant temperature wine cabinet, comprising:
- a cabinet body, the cabinet body comprises a compartment with a temperature sensor inside the compartment, the temperature sensor being used to detect an actual temperature of the compartment:
- a refrigeration unit, the refrigeration unit comprises a single compressor, a single evaporator, and an air duct assembly; and
- a control mainboard, the control mainboard electrically connected to the compressor and the temperature sensor: wherein, the control mainboard is used to implement the constant temperature control method as described in technical solutions above.

As an optional technical solution, wherein the air duct assembly comprises a damper component, the damper component comprises a first valve, a second valve, and a switch, the switch controlling the opening or closing of the first and second valves.

As compared with the prior art, the present invention provides a constant temperature control method, electronic device, and constant temperature wine cabinet. The constant temperature control method involves baseline correction of the compressor's switch-on and switch-off temperatures at the baseline environmental temperature and baseline compartment temperature. Based on this, at various preset environmental temperatures and baseline compartment temperatures, the temperature differences caused by different environmental temperatures on the set compartment temperatures are obtained. These differences are used to adjust the switch-on and switch-off temperatures of the compressor under actual environmental temperatures, thereby ensuring that the set compartment temperature and the actual temperature of the compartment are consistently maintained.

BRIEF DESCRIPTION OF THE DRAWINGS

FIG. 1 is a flowchart of a constant temperature control method in an embodiment of the present invention.

DETAILED DESCRIPTION

Figure 2:
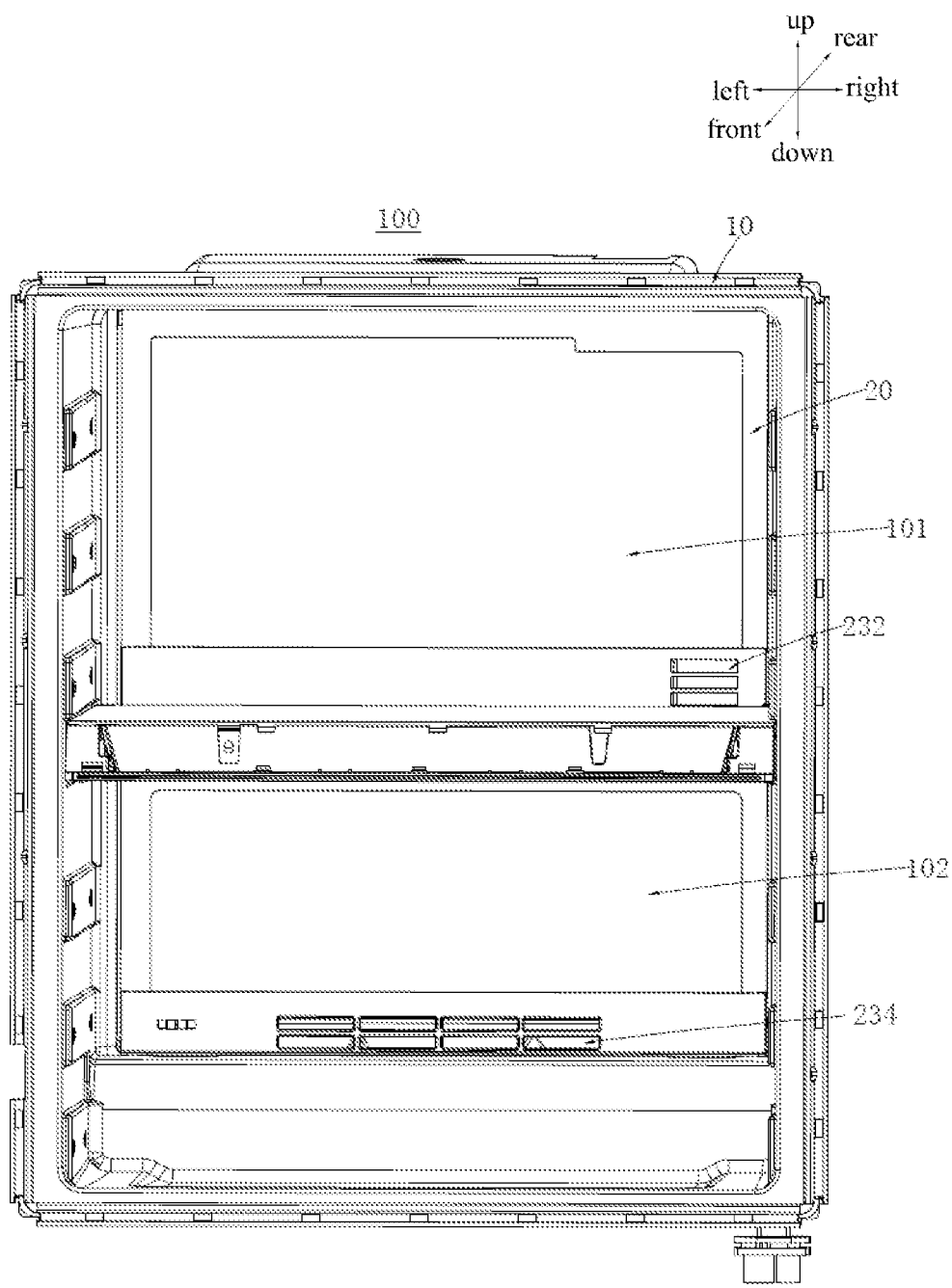
FIG. 2 is a view of a partial structural of a constant temperature wine cabinet in an embodiment of the present invention.

In order to enable the objectives, technical solutions, and advantages of the present invention clearer, the invention will be further described in detail with reference to embodiments and figures. It should be understood that the specific embodiments described here are only used to explain the present invention and are not intended to limit the invention.

In the description of this invention, it should be noted that the terms "center," "upper," "lower," "left," "right," "vertical," "horizontal," "inside," "outside," etc., indicate the orientation or positional relationship based on the orientation or position shown in the figures. They are merely for convenience in describing the invention and simplifying the description and do not indicate or imply that the device or element must have a specific orientation, be constructed and operated in a specific orientation, and should not be considered as limiting the invention. Furthermore, the terms "first," "second," etc., are used for descriptive purposes only and cannot be interpreted as indicating or implying relative importance.

As shown in FIG. 1, an embodiment of the present invention provides a constant temperature control method 1000, applicable to refrigeration appliance, which eliminates the fluctuations in the actual temperature in a compartment of the refrigeration appliance by correcting for the effect of different ambient temperatures on the switch-on point temperature and switch-off point temperature of the compressor 50 of the refrigeration appliance, ensuring that the actual temperature in the compartments matches the set compartment temperature.

The constant temperature control method 1000 includes:
- obtaining a first temperature difference between the first actual temperature of the compartment and the baseline compartment temperature at a baseline environmental temperature:
- modifying the switch-on and switch-off temperatures of the compressor 50 of the refrigeration appliance to obtain a first revised switch-on temperature and a first revised switch-off temperature based on this first temperature difference:
- obtaining a second temperature difference between the baseline compartment temperature and the second actual temperature of the compartment at an actual environmental temperature:
- modifying the first revised switch-on temperature and the first revised switch-off temperature to obtain a second revised switch-on temperature and a second revised switch-off temperature based on the second temperature difference; and
- controlling the compressor 50 of the refrigeration appliance to switch on at the second revised switch-on temperature and switch off at the second revised switch-off temperature.

In a preferred embodiment, the step of obtaining the first temperature difference between the actual temperature of the compartment and the baseline compartment temperature includes:
- setting the baseline compartment temperature at the baseline environmental temperature:
- controlling the compressor 50 according to the first revised switch-on and switch-off temperatures, and measuring the first actual temperature of the compartment:
- calculating the first temperature difference between the first actual temperature and the baseline compartment temperature.

In this embodiment, based on the baseline environmental temperature and baseline compartment temperature, determined a value of the effect of the baseline environmental temperature on the first actual temperature, namely the first temperature difference. The first difference is used to modify the switch-on and switch-off temperatures of the compressor 50, thereby eliminating the effect of the baseline environmental temperature on the first actual temperature and ensuring that the first actual temperature closely approximates the baseline compartment temperature.

Considering that the refrigeration appliance is, for example, a constant temperature wine cabinet, the baseline environmental temperature is, for example, 32° C., and the baseline compartment temperature is, for example, 12° C.

Additionally, depending on the type of refrigeration appliance, the baseline environmental temperature and baseline compartment temperature can be appropriately adjusted.

In a preferred embodiment, the step of obtaining the second temperature difference between the baseline compartment temperature and the actual temperature of the compartment at the actual environmental temperature includes:

setting the baseline compartment temperature at several different preset environmental temperatures:

controlling the compressor 50 according to the first revised switch-on and switch-off temperatures, measuring the actual temperature of the compartment at several different preset environmental temperatures, and obtaining several third actual temperatures:

calculating the difference between each third actual temperature and the baseline compartment temperature to obtain several third temperature differences:

establishing a linear regression equation based on several third temperature differences and several different preset environmental temperatures:

obtaining the second temperature difference corresponding to the actual environmental temperature based on the linear regression equation.

In this embodiment, after completing the parameter correction of the first switch-on and switch-off temperatures of the compressor 50 at the baseline environmental temperature and baseline compartment temperature: at different present environmental temperature and the baseline compartment temperature, further measures a value of the effect of different present environmental temperature on the third actual temperature, namely the third temperature differences. Based on several different preset environmental temperatures and several third temperature differences, a linear regression equation is established. This equation is used to obtain the effect value of any actual environmental temperature on the actual temperature of the compartment, namely the second temperature difference. Finally, the second temperature difference is used to modify the first revised switch-on and switch-off temperatures of the compressor 50, forming the second revised switch-on and switch-off temperatures.

Further, the set compartment temperature of the refrigeration appliance is established, and the compressor 50 is controlled to work according to the second revised switch-on and switch-off temperatures. At this point, the second actual temperature of the compartment always equals the set compartment temperature.

It should be noted that the set compartment temperature is a temperature that varies from the baseline compartment temperature and is determined based on actual storage needs. Generally, the set compartment temperature is greater than or less than the baseline compartment temperature.

Additionally, by measuring the effect of different preset environmental temperatures on the actual temperature corresponding to the baseline compartment temperature and establishing a linear regression equation, the effect values of different environmental temperatures on the actual temperature of the compartment (the second temperature difference) are essentially obtained. These values are used to modify the switch-on and switch-off points of the compressor 50, thereby correcting the effect of environmental temperature on the actual temperature and ensuring that the actual temperature of the compartment always matches the set compartment temperature.

In a preferred embodiment, considering that the refrigeration appliance is, for example, a constant temperature wine cabinet, the several different preset environmental temperatures include 43° C., 21° C., and 12° C.

Furthermore, based on the type of refrigeration appliance, the baseline environmental temperature and baseline compartment temperature can be appropriately adjusted.

The present invention also provides an electronic device, which includes a memory and a processor. The memory stores a computer program that can run on the processor. When the processor executes the computer program, it implements the constant temperature control method 1000.

Figure 3:
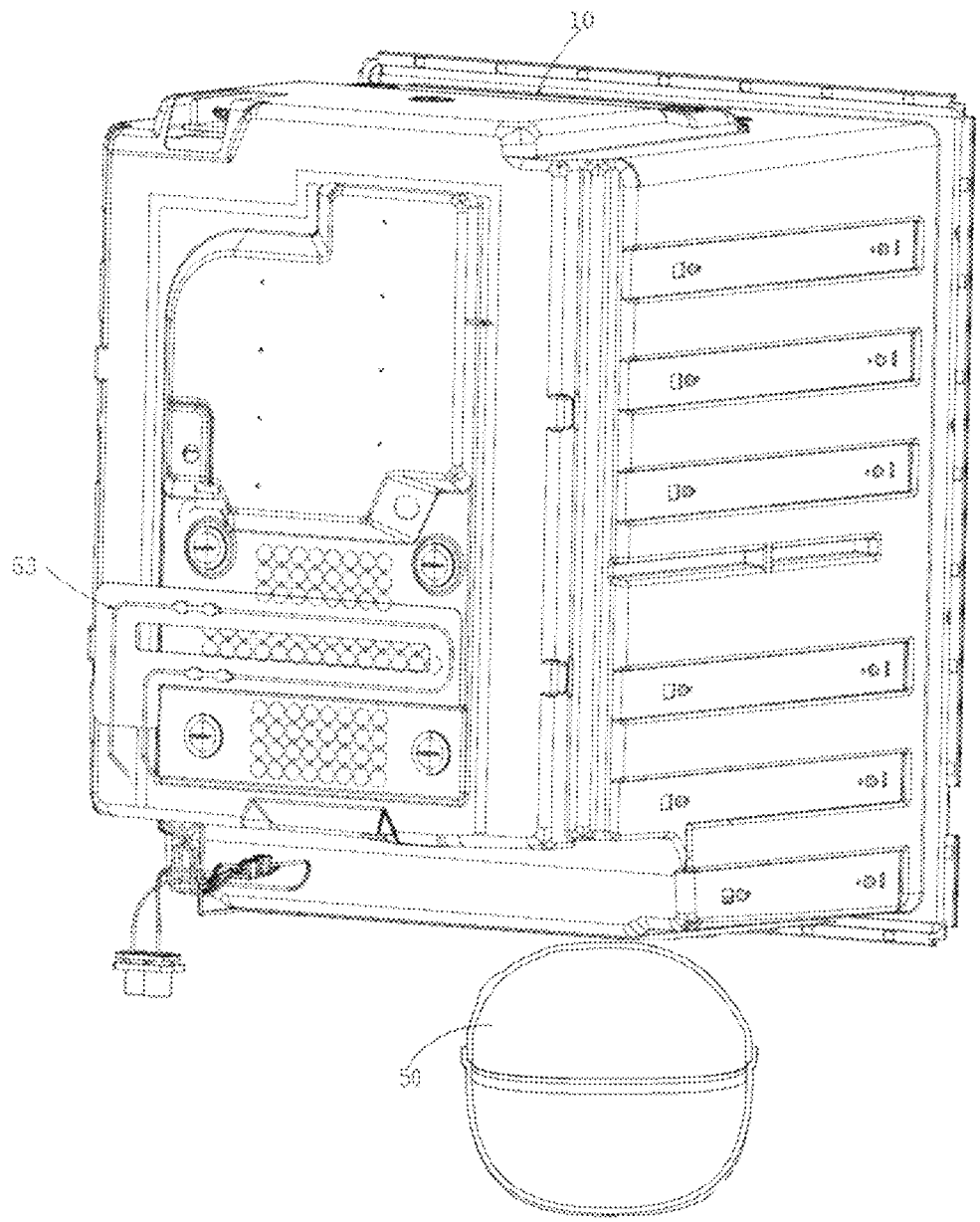
FIG. 3 is view of the constant temperature wine cabinet shown in FIG. 2 from another perspective.
Figure 4:
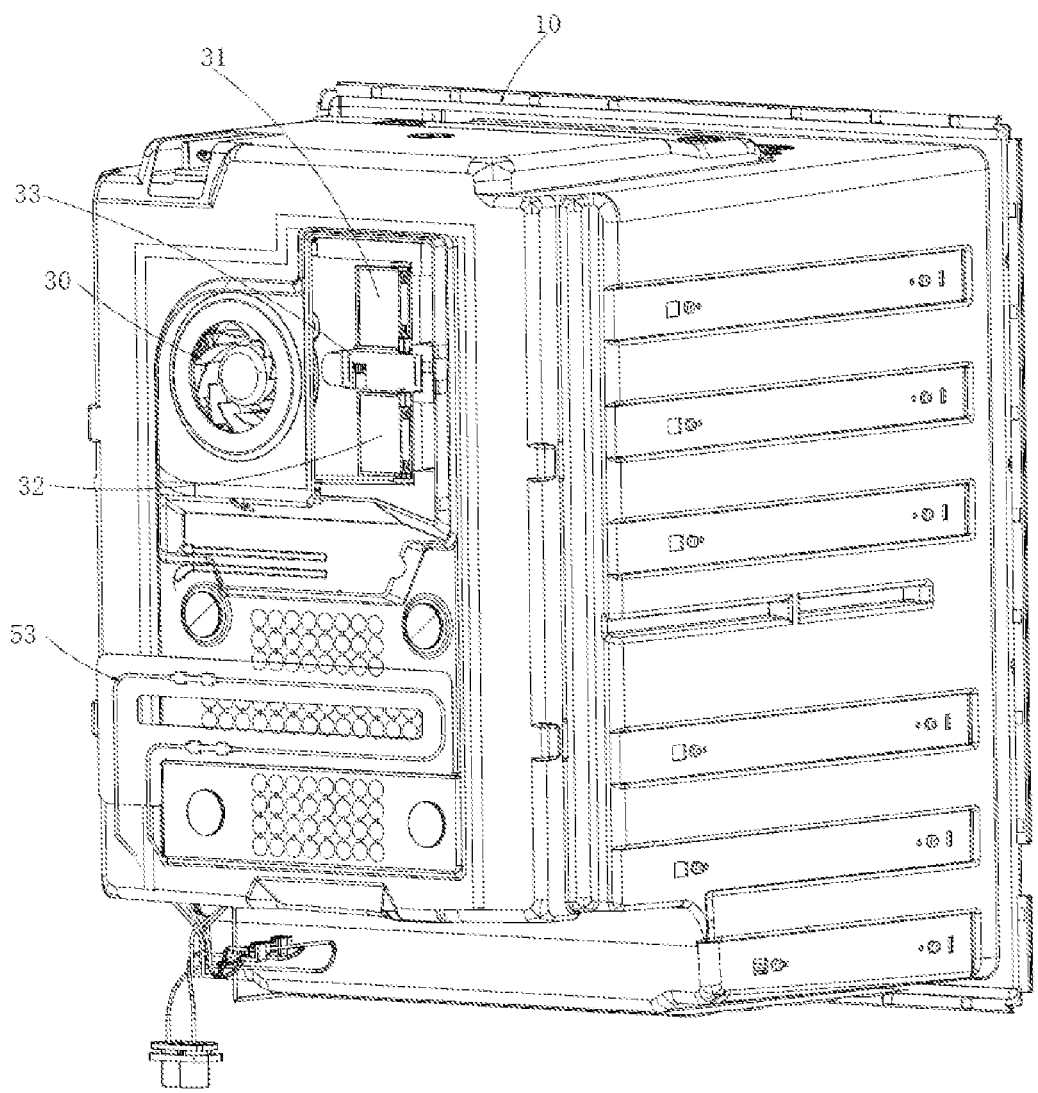
FIG. 4 is a partial sectional view of the constant temperature wine cabinet in FIG. 2.
Figure 5:
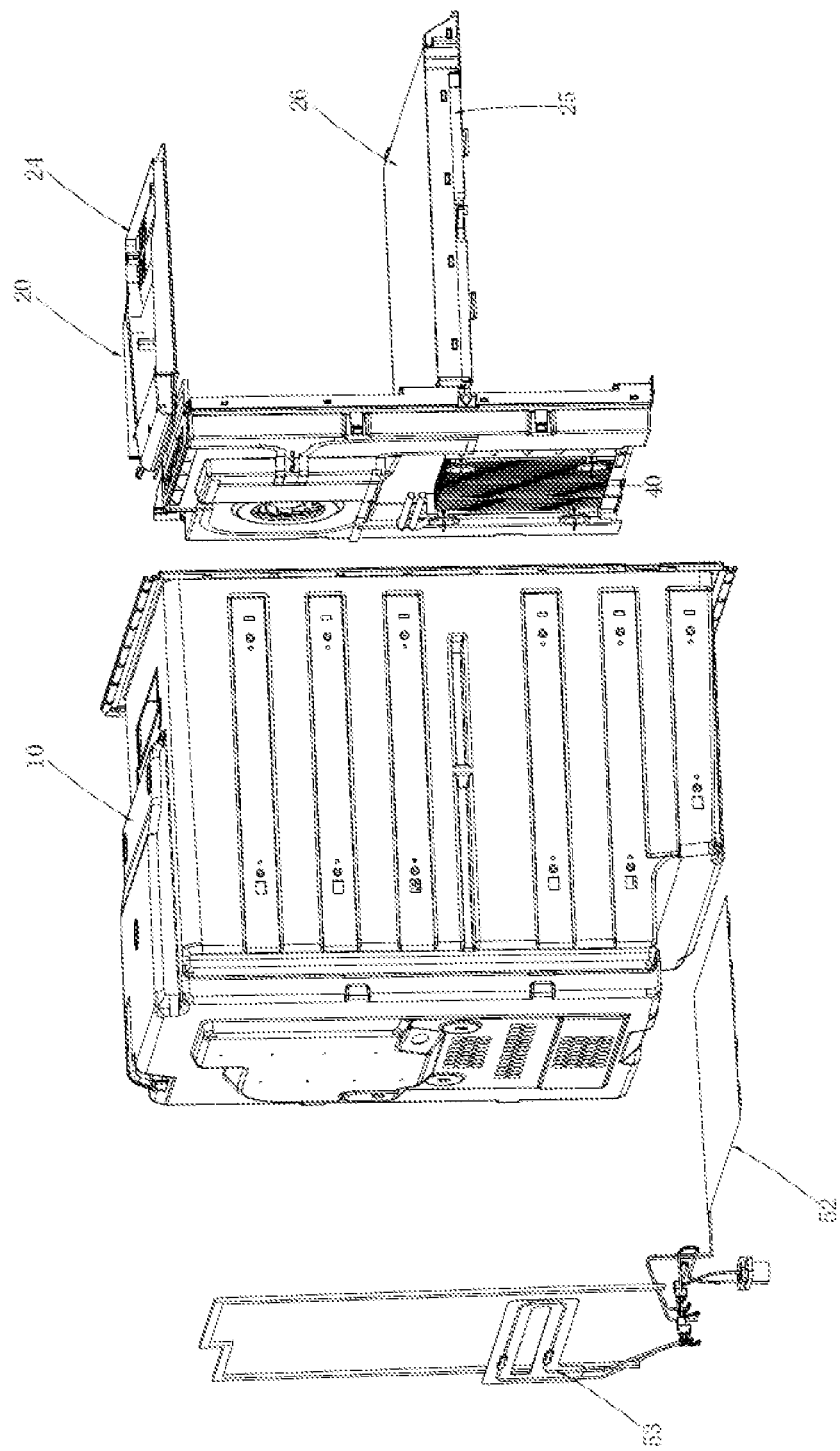
FIG. 5 is an exploded view of the constant temperature wine cabinet in FIG. 2.
Figure 6:
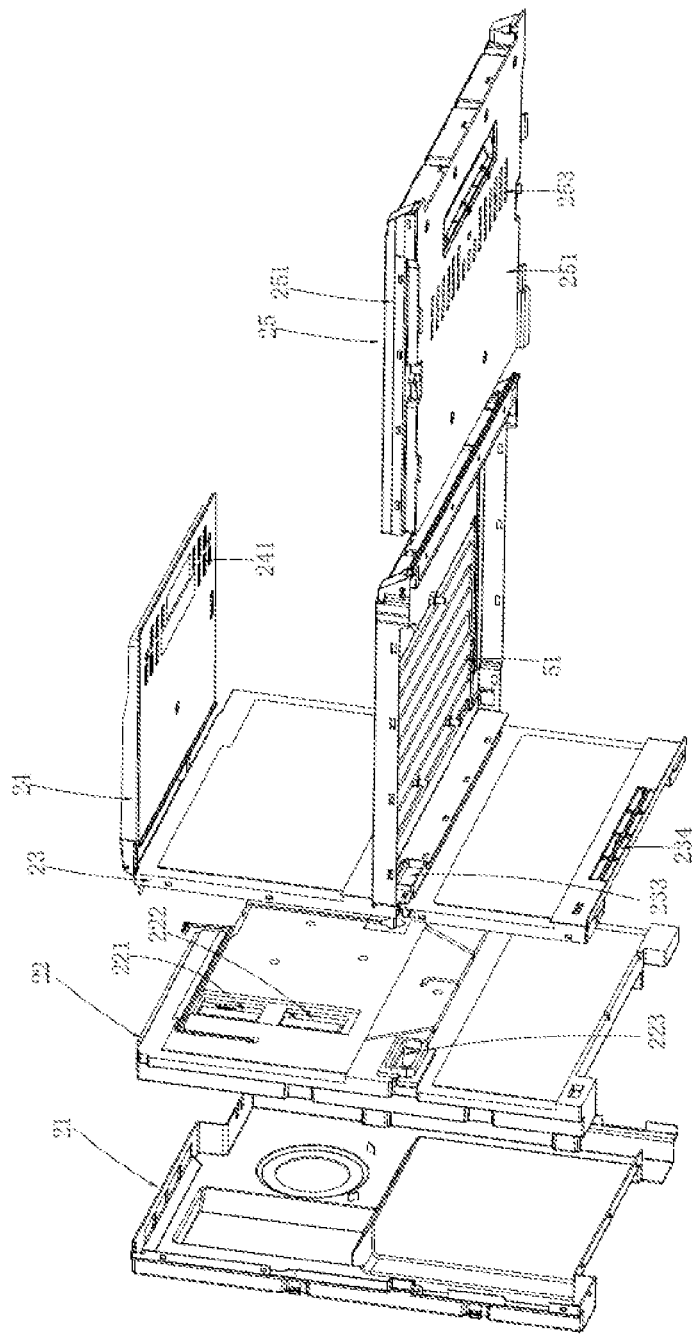
FIG. 6 is an exploded view of the air duct assembly in FIG. 5.
Figure 7:
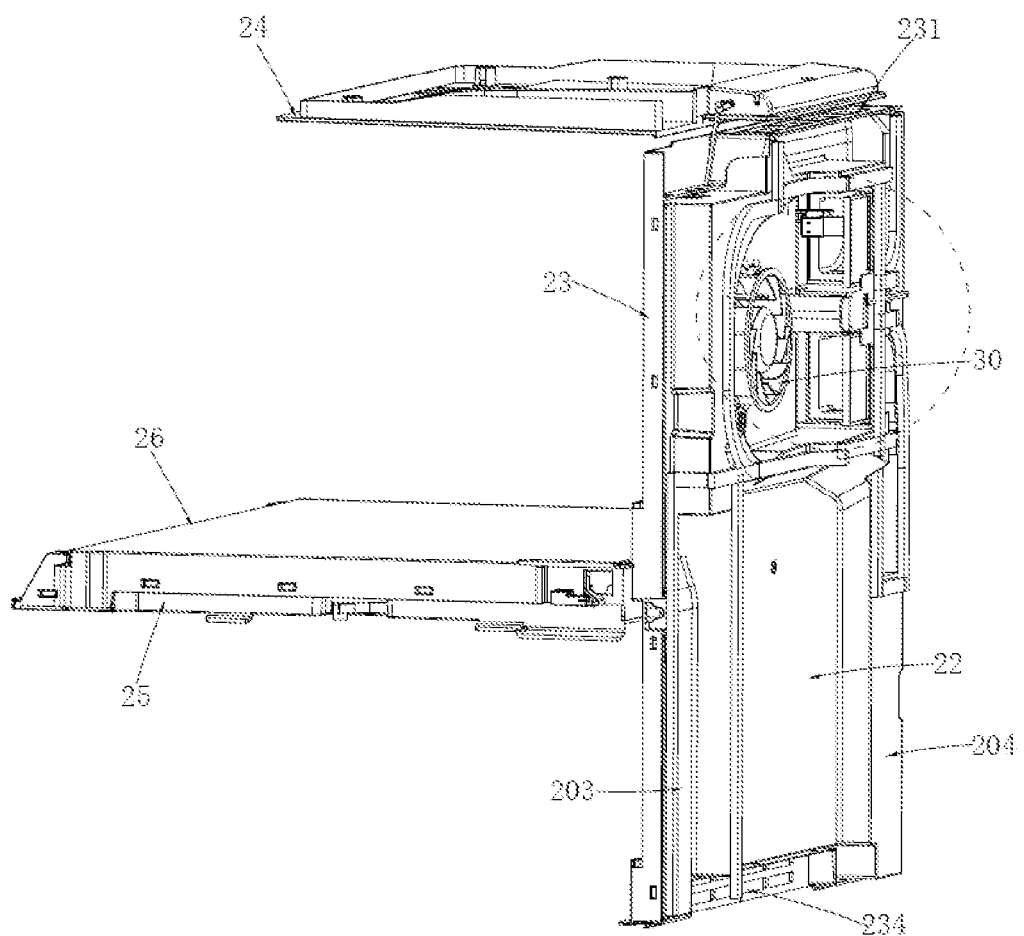
FIG. 7 is a view showing valves of the air duct assembly are opening in FIG. 5.
Figure 8:
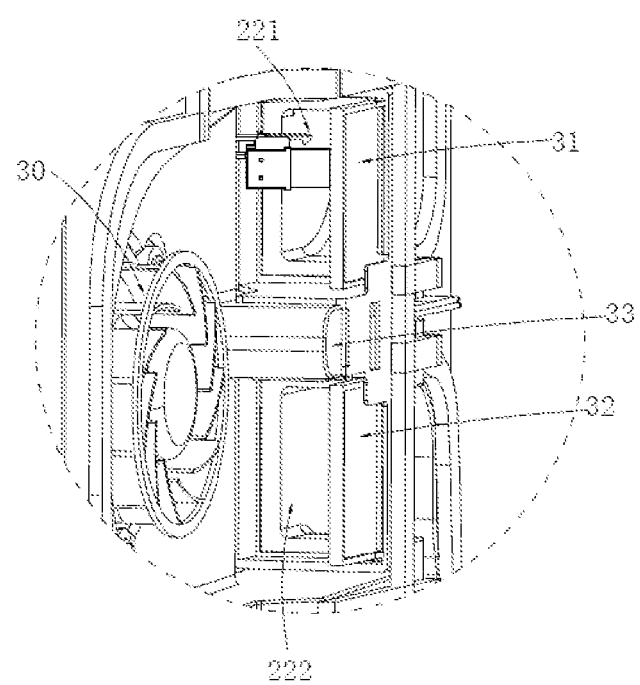
FIG. 8 is an enlarged view of the dashed line area in FIG. 7.
Figure 9:
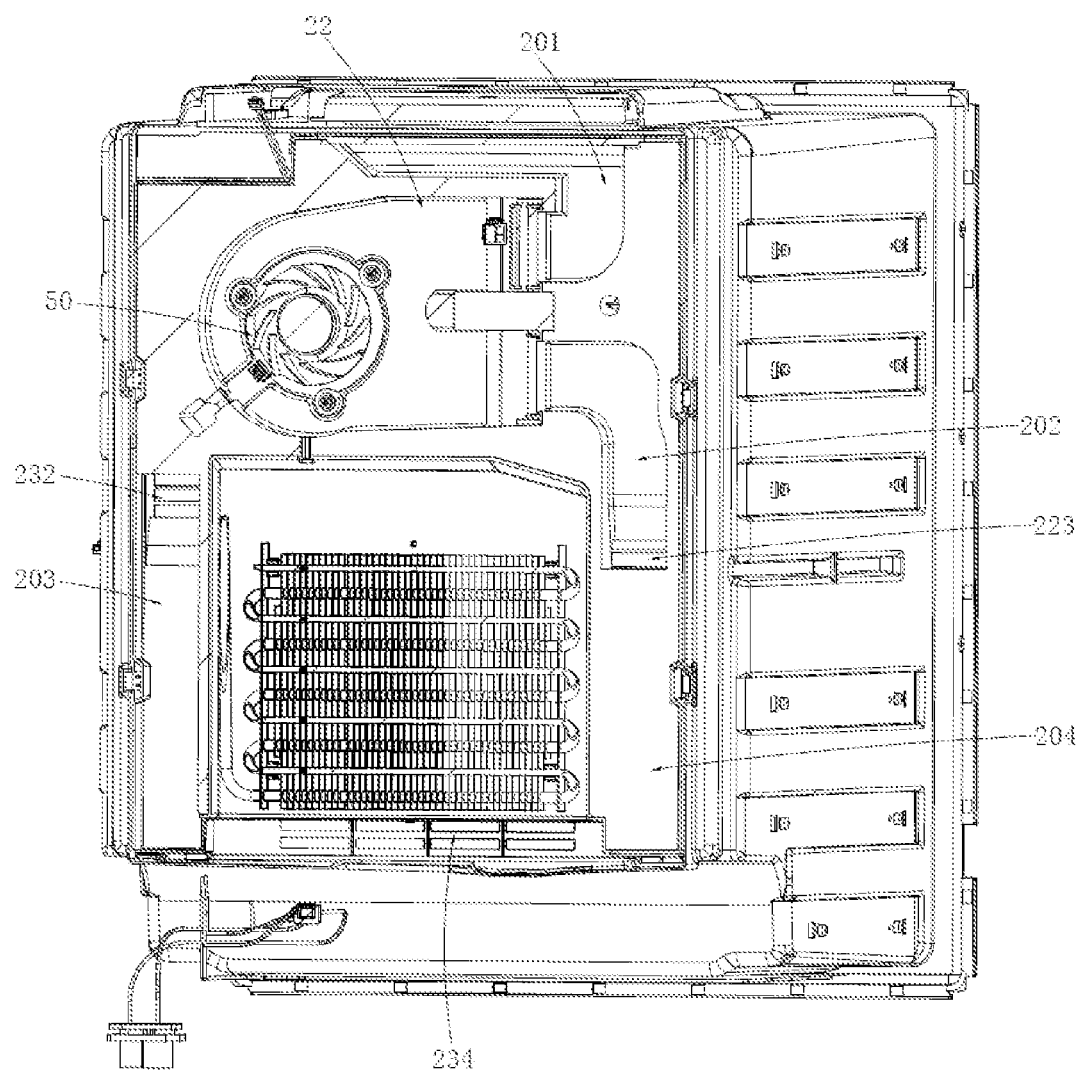
FIG. 9 is another partial sectional view of the constant temperature wine cabinet in FIG. 2.

As shown in FIGS. 2 to 9, the present invention also provides a constant temperature wine cabinet 100. The constant temperature wine cabinet 100 includes a cabinet body, a refrigeration unit, and a control mainboard. The cabinet body comprises a compartment with a temperature sensor inside the compartment, the temperature sensor being used to detect the actual temperature of the compartments. The refrigeration unit includes a compressor 50, an evaporator 40, a fan, and an air duct assembly 20. The control unit is electrically connected to the compressor 50 and the temperature sensor, and the control mainboard is used to execute the constant temperature control method 1000.

In this embodiment, the constant temperature wine cabinet 100 is an air-cooled wine cabinet with dual-temperature zone. The air-cooled wine cabinet is a vertical wine cabinet, including a cabinet body (not shown in the figure), compressor 50, and evaporator 40. The cabinet body houses an inner liner 10, which forms a refrigerated chamber for storing wine.

The constant temperature wine cabinet 100 also includes an air duct assembly 20 provided within the refrigerated chamber formed by the inner liner 10, for storing wine.

The air duct assembly 20 of the constant temperature wine cabinet includes a first cover plate 21, a second cover plate 22, and a third cover plate 23, which are sequentially snap-fitted together in the front-back direction. The fan 30 and the damper component are assembled in the space between the first cover plate 21 and the second cover plate 22. The fan 30 and the damper component are respectively fixed to the side surface of the second cover plate 22 facing the first cover plate 21. Additionally, the first cover plate 21 is positioned near the rear wall of the inner liner 10. The evaporator 40 is located on the surface of the first cover plate 21 facing the rear wall of the inner liner 10.

The fan 30 and the damper are adjacently arranged, and in the present embodiment, the fan 30 and the damper are arranged adjacent to each other in the left-right direction.

Moreover, the space between the second cover plate 22 and the third cover plate 23 also provides an upper air supply duct 201, a lower air supply duct 202, a first return air duct 203, and a second return air duct 204.

The damper component includes a first valve 31, a second valve 32, and a switch 33, where the switch 33 is electrically connected to the first valve 31 and the second valve 32.

The second cover plate 22 provides a first air outlet 221 and a second air outlet 222, the first valve 31 is located at the first air outlet 221, and the second valve 32 is located at the second air outlet 222. The first air outlet 221 connects to the upper air supply duct 201, and the second air outlet 222 connects to the lower air supply duct 202.

The upper air supply duct 201 further connects to an opening 231 at the top of the third cover plate 23, the opening 231 connects to the first air supply port 241 of the upper air supply unit 24. The space between the upper air supply unit 24 and the top side wall of the inner liner 10 forms an upper circulation channel. The air blown out from the upper air supply duct 201 passes through the opening 231, the upper circulation channel, and the first air supply port 241 to the upper compartment 101.

In a preferred embodiment, the first air supply port 241 is located at the front end of the upper air supply unit 24, the front end of the upper air supply unit 24 being close to the front side of the upper compartment 101.

The lower air supply duct 202 also connects to the first opening 223 on the second cover plate 22. The first opening 223 corresponds to and intercommunicates with the second opening 233 on the third cover plate 23. The second opening 233 connects to the second air supply port 253 of the lower air supply unit 25.

The lower air supply unit 25 includes a first channel plate 251 and a second channel plate 252, which are snap-fitted together. The space between the first channel plate 251 and the second channel plate 252 forms a lower circulation channel. The air blown out from the lower air supply duct 202 passes through the first opening 223, the second opening 233, the lower circulation channel, and the second air supply port 253 to the lower compartment 102.

The second air supply port 253 is located on the side of the second channel plate 252 facing the lower compartment 102. Preferably, the second air supply port 253 is positioned at the front end of the second channel plate 252, which is near the front side of the compartment.

In this embodiment, the compartment defined by the inner liner 10 is divided into an upper compartment 101 and a lower compartment 102 by a partition 26, and the lower air supply unit 25, for example, is snap-fitted and fixed to the side of the partition 26 facing the lower compartment 102. That is, the lower air supply unit 25 is located in the middle part of the compartment of the inner liner 10 and at the top of the lower compartment 102, but this is not a limitation.

As shown in FIGS. 6 to 9, the third cover plate 23 of the constant temperature wine cabinet is equipped with a first return air port 232 and a second return air port 234. The first return air port 232 connects the upper compartment 101 with the first return air duct 203, and the second return air port 234 connects the lower compartment 102 with the second return air duct 204. The lower ends of the first and second return air ducts 203 and 204 are respectively connected to the evaporator 40.

In this embodiment, the first air supply port 241 and the second air supply port 253 are respectively located at the top front positions of the upper compartment 101 and the lower compartment 102. This arrangement helps in uniformly distributing the air delivered by the fan 30 throughout the compartments. The first return air port 232 and the second return air port 234 are located at the bottom positions of the upper compartment 101 and the lower compartment 102, respectively, which assists in quickly transferring the air inside the compartments through the first return air duct 203 and the second return air duct 204 to the evaporator 40, enhancing temperature control efficiency.

It should be noted that the wine cabinet 100 is equipped with only a single evaporator 40 and a single fan 30. By using the damper component, the air from the fan 30 is distributed towards the upper air supply duct 201 and/or the lower air supply duct 202, achieving dual-temperature zone constant temperature control in a single system wine cabinet.

As shown in FIGS. 2, 3, 5, and 6, the constant temperature wine cabinet 100 also includes a heating unit, which comprises a first heating wire 51, a second heating wire 52, and a third heating wire 53. The first heating wire 51 is located at the bottom of the partition 26, that is, at the bottom of the upper compartment 101: the second heating wire 52 is located on the outside of the bottom of the inner liner 10, that is, at the bottom of the lower compartment 102: the third heating wire 53 is located on the side of the rear wall of the inner liner 10, away from the air duct assembly, where the third heating wire 53 is opposite to the evaporator 40.

In this embodiment, the third heating wire 53 is positioned opposite to the evaporator 40, facilitating rapid provision of heat to the evaporator 40 during constant temperature control of the wine cabinet 100. Once the fan 30 is activated, it quickly circulates the heat from around the evaporator 40 throughout the compartments, enabling rapid temperature increase.

Additionally, the first heating wire 51 and the second heating wire 52 are respectively located at the bottoms of the upper compartment 101 and the lower compartment 102. Utilizing the principle that hot air rises, this arrangement enables uniform heating within the compartments.

The heating provided by the heating unit meets the need for constant temperature maintenance in the wine cabinet 100, especially in conditions of low environmental temperature or when wine needs to be stored at higher temperatures.

The wine cabinet 100 broadly includes a refrigeration unit, a heating unit, a temperature sensor unit, and a control mainboard. The refrigeration unit comprises a compressor 50, a evaporator 40, a fan 30, and an air duct assembly 20. It utilizes the evaporator 40 for cooling, and the fan 30 for delivering cold air formed by heat exchange with the evaporator 40 into the compartments for cooling. The heating unit provides heat generated by the heating device to the compartments for heating. The temperature sensor unit is used to detect the actual temperature inside the compartments and the external environmental temperature of the wine cabinet. The control mainboard selects cooling by the refrigeration unit and/or heating by the heating unit based on the actual temperature inside the compartments.

The constant temperature control modes of the wine cabinet 100 generally include: 1) both the upper compartment 101 and the lower compartment 102 requiring cooling: 2) one of the upper compartment 101 or the lower compartment 102 requiring cooling while the other requires heating; and 3) both the upper compartment 101 and the lower compartment 102 requiring heating.

When both the upper compartment 101 and the lower compartment 102 of the wine cabinet require cooling, the constant temperature control process involves a single cooling process.

The cooling process includes:

Firstly, the control mainboard acquires the actual temperatures of the upper compartment 101 and the lower compartment 102. If it determines that the actual temperature of the upper compartment 101 is higher than the first set compartment temperature, and the actual temperature of the lower compartment 102 is higher than the second set compartment temperature.

Secondly, the control mainboard acquires the actual environmental temperature and plugs the actual environmental temperature in a linear regression equation to obtain a corrected temperature difference (i.e., the second temperature difference in the constant temperature control method 1000) which corresponding to the actual environmental temperature. The switch-on and switch-off temperatures of the compressor 50 are corrected based on this corrected temperature difference.

The compressor 50 switches on and switches off according to the corrected switch-on and switch-off temperatures for cooling next.

The control mainboard then controls the switch 33 in the damper component to open both the first valve 31 and the second valve 32. The fan 30 is activated, circulating the cooling provided by the evaporator 40 through the first air gate 221, the upper air supply duct 201, the upper circulation channel in the upper air supply unit 24, and the first air supply port 241 to the upper compartment 101. This ensures that the actual temperature of the upper compartment 101 matches the first set compartment temperature. Similarly, the fan 30 circulates the cooling through the second air gate 222, the lower air supply duct 202, the lower circulation channel in the lower air supply unit 25, and the second air supply port 253 to the lower compartment 102. This ensures that the actual temperature of the lower compartment 102 matches the second set compartment temperature.

It is important to note that before modifying the compressor's switch-on and switch-off temperatures based on the corrected temperature difference obtained by plugging the actual environmental temperature into the linear regression equation, the compressor's switch-on and switch-off temperatures have already undergone a baseline correction process. This baseline correction process involves: obtaining the baseline temperature difference between the baseline compartment temperature and the actual temperature of the compartment at the baseline environmental temperature (i.e., the first temperature difference in the constant temperature control method 1000). Using this baseline temperature difference between the baseline compartment temperature and the actual temperature of the compartment to perform a baseline correction of the compressor's initial switch-on and switch-off temperatures, obtaining the first revised switch-on temperature and the first revised switch-off temperature.

Therefore, the first revised switch-on and switch-off temperatures of the compressor 50 are modified based on the corrected temperature difference, leading to the second revised switch-on and switch-off temperatures. The compressor 50 operates according to these second revised switch-on and switch-off temperatures.

In summary, after the baseline correction, the compressor's first revised switch-on and switch-off temperatures are further modified through a secondary correction. The corrected temperature difference of the secondary correction is obtained through the linear regression equation, primarily aims to eliminate the effect of the actual environmental temperature on the actual temperature of the compartment. This ensures that the actual temperature of the compartment remains consistent with the set compartment temperature.

Additionally, when the control mainboard identifies that the temperature difference between the first and second set compartment temperatures is greater than a preset value, it recognizes the lower of the two temperatures and controls the switch of the damper component's to open the valve corresponding to the compartment with the lower set temperature. This prioritizes cooling the compartment with the lower set temperature, helping both compartments reach their respective set temperatures more quickly.

Furthermore, when the temperature difference between the first and second set compartment temperatures is less than the preset value, the control mainboard controls the switch of the damper component to simultaneously open both the first valve at the first air outlet (connecting to the upper compartment) and the second valve at the second air outlet (connecting to the lower compartment). This simultaneously supplies cooling to both the upper and lower compartments, also helping them reach their respective set temperatures more quickly.

When one of the compartments requires cooling while the other requires heating, the constant temperature control process of the wine cabinet 100 specifically includes both cooling and heating processes.

The cooling process is similar to the control process described above for when both the upper and lower compartments require cooling. This involves modifying the switch-on and switch-off temperatures of the compressor 50, which have already been baseline corrected, based on the actual environmental temperature's corresponding temperature difference. The compressor 50 operates according to these secondarily modified switch-on and switch-off temperatures. The fan 30 is activated, and the switch 33 controls either the first valve 31 or the second valve 32 to open. The cool air is then circulated through the upper air supply duct 201 and upper air supply unit 24 into the upper compartment 101 via the first air supply port 241, ensuring the actual temperature of the upper compartment 101 matches the first set compartment temperature, or alternatively, the cool air is circulated through the lower air supply duct 202 and lower air supply unit 25 into the lower compartment 102 via the second air supply port 253, ensuring the actual temperature of the lower compartment 102 matches the second set compartment temperature.

The heating process includes:

During the cooling process of the compressor 50 and evaporator 40, either the first heating wire 51 at the bottom of the upper compartment 101 or the second heating wire 52 at the bottom of the lower compartment 102 is activated to supply heat to the corresponding compartment (the upper compartment 101 or the lower compartment 102).

The switch 33 ensures that both the first valve 31 and the second valve 32 remain closed.

The third heating wire 53, corresponding to the evaporator 40, is activated to supply heat towards the evaporator. When the actual temperature of the evaporator 40 rises to a preset temperature, the switch 33 controls either the first valve 31 or the second valve 32 to open. The fan 30 is then activated, and hot air is circulated through the upper air supply duct 201, the upper air supply unit 24, and the first air supply port 241 into the upper compartment 101, ensuring that the actual temperature of the upper compartment 101 matches the first set compartment temperature. Alternatively, hot air is circulated through the lower air supply duct 202, the lower air supply unit 25, and the second air supply port 253 into the lower compartment 102, ensuring that the actual temperature of the lower compartment 102 matches the second set compartment temperature.

In this embodiment, the arrangement of the third heating wire 53, corresponding to the evaporator 40, facilitates the transfer of hot air to the compartment requiring heating after the cooling process of the evaporator 40. This ensures that the actual temperature inside the compartment being heated aligns quickly with the set temperature, thus improving the efficiency of the constant temperature control's heating process.

Additionally, the heating rate of the third heating wire 53 can be greater than that of the first heating wire 51 and the second heating wire 52.

When both the upper compartment 101 and the lower compartment 102 require heating, the constant temperature control process includes a single heating process.

The heating process involves:

Simultaneously activating the first heating wire 51, the second heating wire 52, and the third heating wire 53.

The switch 33 controls the opening of both the first valve 31 and the second valve 32.

The fan 30 is activated, and hot air is circulated through the upper air supply duct 201, the upper air supply unit 24, and the first air supply port 241 into the upper compartment 101, ensuring that the actual temperature of the upper compartment 101 matches its first set compartment temperature. Similarly, hot air is circulated through the lower air supply duct 202, the lower air supply unit 25, and the second air supply port 253 into the lower compartment 102, ensuring that the actual temperature of the lower compartment 102 matches its second set compartment temperature.

The prerequisite for opening both the first valve 31 and the second valve 32 simultaneously is that the first set compartment temperature and the second set compartment temperature are close to each other.

Additionally, when the control mainboard determines that the temperature difference between the first set compartment temperature and the second set compartment temperature is greater than a preset value, it identifies the higher of the two temperatures. Subsequently, it controls the switch of the damper component to open the valve corresponding to the compartment with the higher set temperature. This prioritizes heating the compartment with the higher set temperature, assisting both compartments in quickly reaching their respective set temperatures.

Overall, the present invention provides a constant temperature control method, electronic device, and constant temperature wine cabinet. The constant temperature control method involves baseline correction of the compressor's switch-on and switch-off temperatures at the baseline environmental temperature and baseline compartment temperature. Based on this, at various preset environmental temperatures and baseline compartment temperatures, the temperature differences caused by different environmental temperatures on the set compartment temperatures are obtained. These differences are used to adjust the switch-on and switch-off temperatures of the compressor 50 under actual environmental temperatures, thereby ensuring that the set compartment temperature and the actual temperature of the compartment are consistently maintained.

This embodiment, as described above, is just one example of implementing the invention. Additionally, the technical features involved in the different embodiments of the invention described above can be combined with each other as long as they do not conflict. It should be noted that there can be many other embodiments of this invention which, without departing from the spirit and essence of the invention, can be understood and implemented by those skilled in the field. Such corresponding changes and modifications should fall within the protection scope of the claims attached to this invention.

The invention claimed is:

1. A constant temperature control method, applicable to a refrigeration appliance, the refrigeration appliance comprising a compartment, a compressor, and a temperature sensor for detecting an actual temperature of the compartment, wherein the constant temperature control method comprising:

obtaining a first temperature difference between a first actual temperature of the compartment and a baseline compartment temperature at a baseline environmental temperature;

modifying initial switch-on and switch-off temperatures of the compressor based on the first temperature difference to obtain a first revised switch-on temperature and a first revised switch-off temperature;

at an actual environmental temperature, obtaining a second temperature difference between the baseline compartment temperature and a second actual temperature of the compartment;

modifying the first revised switch-on temperature and the first revised switch-off temperature based on the second temperature difference to obtain a second revised switch-on temperature and a second revised switch-off temperature; and controlling the compressor to switch on at the second revised switch-on temperature and switch off at the second revised switch-off temperature.

2. The constant temperature control method according to claim 1, wherein the step of obtaining the first temperature difference between the actual temperature of the compartment and the baseline compartment temperature comprises:

setting the baseline compartment temperature at the baseline environmental temperature;

controlling the compressor according to the first revised switch-on and switch-off temperatures, and measuring the first actual temperature of the compartment;

calculating the first temperature difference between the first actual temperature and the baseline compartment temperature.

3. The constant temperature control method according to claim 1, wherein the step of obtaining the second temperature difference comprises:

setting the baseline compartment temperature at several different preset environmental temperatures;

controlling the compressor according to the first revised switch-on and switch-off temperatures, measuring the actual temperature of the compartment at the several different preset environmental temperatures to obtain several third actual temperatures;

calculating the difference between each third actual temperature and the baseline compartment temperature to obtain several third temperature differences;

establishing a linear regression equation based on the several third temperature differences and the several different preset environmental temperatures;

obtaining the second temperature difference corresponding to the actual environmental temperature based on the linear regression equation.

4. The constant temperature control method according to claim 1, wherein the refrigeration appliance is a constant temperature wine cabinet.

5. The constant temperature control method according to claim 1, wherein when controlling the compressor to switch on at the second revised switch-on temperature and switch off at the second revised switch-off temperature, the second actual temperature equals a set compartment temperature.

6. The constant temperature control method according to claim 5, wherein the set compartment temperature is greater than or less than the baseline compartment temperature.

7. The constant temperature control method according to claim 1, wherein the baseline environmental temperature is 32° C.; the baseline compartment temperature is 12° C.

8. An electronic device, comprising a memory and a processor, the memory storing a computer program that can run on the processor, wherein the processor implements the constant temperature control method as described in claim 1 when executing the computer program.

9. A constant temperature wine cabinet, comprising:
- a cabinet body, the cabinet body comprises a compartment with a temperature sensor inside the compartment, the temperature sensor being used to detect an actual temperature of the compartment;
- a refrigeration unit, the refrigeration unit comprises a single compressor, a single evaporator, and an air duct assembly; and
- a control mainboard, the control mainboard electrically connected to the compressor and the temperature sensor; wherein, the control mainboard is used to implement the constant temperature control method as described in claim 1.

10. The constant temperature wine cabinet according to claim 9, wherein the air duct assembly comprises a damper component, the damper component comprises a first valve, a second valve, and a switch, the switch controlling the opening or closing of the first and second valves.

\* \* \* \* \*